US012760816B2

(12) United States Patent
Fiebiger

(10) Patent No.: US 12,760,816 B2
(45) Date of Patent: Oct. 13, 2026

(54) VALVE CONTROL DEVICE, PROCESS ENGINEERING PLANT HAVING A VALVE CONTROL DEVICE, DIAGNOSTIC METHOD AND USE OF A VALVE CONTROL DEVICE

(71) Applicant: Samson Aktiengesellschaft, Frankfurt am Main (DE)

(72) Inventor: Christian Fiebiger, Hofheim am Taunus (DE)

(73) Assignee: Samson Aktiengesellschaft, Frankfurt am Main (DE)

(*) Notice: Subject to any disclaimer, the term of this patent is extended or adjusted under 35 U.S.C. 154(b) by 941 days.

(21) Appl. No.: 18/005,315

(22) PCT Filed: Jun. 28, 2021

(86) PCT No.: PCT/EP2021/067683
§ 371 (c)(1),
(2) Date: Sep. 6, 2023

(87) PCT Pub. No.: WO2022/012909
PCT Pub. Date: Jan. 20, 2022

(65) Prior Publication Data

US 2024/0052948 A1 Feb. 15, 2024

(30) Foreign Application Priority Data

Jul. 14, 2020 (DE) ......................... 102020118556.1

(51) Int. Cl.
*F16K 37/00* (2006.01)
*G05B 17/02* (2006.01)

(52) U.S. Cl.
CPC .......... *F16K 37/0083* (2013.01); *G05B 17/02* (2013.01)

(58) Field of Classification Search
CPC ............ F16K 37/0083; G05B 23/0243; G05B 19/042; G05B 7/02; G05B 2219/25312; G05B 2219/33326; G05B 17/02
(Continued)

(56) References Cited

U.S. PATENT DOCUMENTS 5,311,421 A 5/1994 Nomura et al.
7,085,610 B2 8/2006 Eryurek et al.
(Continued)

FOREIGN PATENT DOCUMENTS

DE 19723650 B9 4/2004
DE 102006003750 A1 8/2006
(Continued)

OTHER PUBLICATIONS

EP 1599712 B1, Date Published: Apr. 9, 2008, English translation (Year: 2008).*
(Continued)

*Primary Examiner* — John H Le
(74) *Attorney, Agent, or Firm* — Banner & Witcoff, Ltd.

(57) ABSTRACT

A position closed-loop controller for a valve control device of a process engineering plant may include a pneumatic control output for a pneumatic control variable, a first signal input for a pilot signal, such as a process control signal from a process closed-loop controller of the process engineering plant, and a second signal input for a position actual signal with regard to a control valve. The position control-loop controller may be designed to generate the pneumatic control variable for an actuator to actuate the control valve based on the pilot signal and the position actual signal. The position closed-loop controller may calculate an approximation signal using a configurable closed-loop controller model based on a closed-loop controller proceeding from the pilot signal. The closed-loop controller model may be configured
(Continued)

such that a signal generated by the particular closed-loop controller proceeding from the approximation signal corresponds to the pilot signal.

19 Claims, 5 Drawing Sheets

(58) Field of Classification Search
USPC .......................................................... 702/183
See application file for complete search history.

(56) References Cited

U.S. PATENT DOCUMENTS

| | | | | |
|---|---|---|---|---|
| 11,199,824 | B2 * | 12/2021 | Blevins | G05B 17/02 |
| 2004/0228173 | A1 | 11/2004 | Schoonover | |
| 2006/0266966 | A1 | 11/2006 | Karte et al. | |
| 2016/0169585 | A1 | 6/2016 | Kumar et al. | |

FOREIGN PATENT DOCUMENTS

| | | | | |
|---|---|---|---|---|
| DE | 102005024674 | A1 | 12/2006 | |
| DE | 102005024686 | A1 | 12/2006 | |
| DE | 602006000731 | T2 | 4/2009 | |
| DE | 602004012980 | T2 | 5/2009 | |
| DE | 102010015647 | A1 | 10/2011 | |
| DE | 102015009253 | A1 | 1/2017 | |
| DE | 102017124293 | A1 | 4/2019 | |
| EP | 1599712 | A2 | 11/2005 | |
| EP | 1451649 | B1 | 5/2007 | |
| EP | 1720081 | B1 | 3/2008 | |
| WO | 2015/012832 | A1 | 1/2015 | |
| WO | WO-2020049214 | A1 * | 3/2020 | F16K 31/1655 |

OTHER PUBLICATIONS

Feb. 23, 2021 (DE) Examination Report—DE App. No. 102020118556.1.

Oct. 5, 2021 (PCT) International Search Report and Written Opinion for App. PCT/EP2021/067683 (with translation).

* cited by examiner

VALVE CONTROL DEVICE, PROCESS ENGINEERING PLANT HAVING A VALVE CONTROL DEVICE, DIAGNOSTIC METHOD AND USE OF A VALVE CONTROL DEVICE

CROSS REFERENCE TO RELATED APPLICATIONS

This patent application is a U.S. national stage application of International Application No. PCT/EP2021/067683, filed Jun. 28, 2021, which claims priority to German Patent Application No. 2020 118 556.1, filed Jul. 14, 2020, each of which is incorporated herein by reference in its entirety.

BACKGROUND

Field

The disclosure relates to a valve control device for a process plant, such as a chemical plant, for example a petrochemical plant, a power plant, for example a nuclear power plant, a food processing plant, for example a brewery, or the like. The disclosure can relate, inter alia, to a process plant with a valve control device. The disclosure further relates to the use of a valve control device for carrying out a diagnostic method relating to a process plant.

Related Art

Valve control devices are commonly employed in process plants in a cascaded process control, as illustrated schematically, for example, in FIG. 5. In a cascaded process control or cascade control, a plurality of controllers are cascaded while the associated control circuits are nested inside each other. At least one process controller (120) is master of a control device (1). The output variable ($p_g$) of the process controller (120) acts as a command variable for the valve control device.

Typical process control applications employ valve control devices with a control valve in order to influence a downstream process towards a predetermined steady-state or dynamic target via changes in the passing volume flows or mass flows. Process controllers implemented for process control do not control the mechanical position of the control valve directly. This is carried out in a slave, i.e. cascaded, control loop by means of a control electronics assembly of the valve control device.

In the controller cascade illustrated by way of example in FIG. 5, the process control difference ($p_d$) formed as the difference between a process setpoint signal ($p_g$) and an actual value process signal ($p_i$) is fed to the process controller (120) in the master, figuratively outer, control loop in the form of an input signal. The process control method of the process controller (120) can be configured to compensate interference variables that influence the process. An output variable, which can be called the process control signal ($p_g$) and which describes the target position of the control valve (35), is generated from the process control difference ($p_c$) via a control method implemented in the process controller (120). This process control signal ($p_g$) is fed to the control device (1). The valve control device (1) additionally captures a signal (i) representing the actual position of the control valve. From these signals, the positioner (31) of the valve control device (1) determines a control signal (g) for controlling an actuator (33), which can be, for example, a pneumatic or electric actuating drive of a control valve. The control method of the positioner (31) can be configured to compensate the valve interference variables acting within the valve control device.

EP 1 451 649 B1 relates to the detection and discrimination of instabilities in a control device. A valve control device with a positioner, actuator and control valve installed in a process environment detects whether an undesired fluctuation occurs due to a mechanical failure of the connection between the actuator and the control valve or due to a faulty configuration of a positioner. To this end, EP 1 451 649 B1 proposes capturing signals within the valve control device and establishing the presence and source of instabilities by means of an estimation unit. The estimation unit carries out statistical analyses in order to detect the presence of an instability. In order to identify the cause of the detected instability, the estimation unit uses phase angles of causally correlated signals to check whether there is a limit cycle in the control circuit of the valve control device. If appropriate, the temporal offset between the pressure signal and the valve position is determined in order to localize the fault cause in the control device. The diagnostic routines described in EP 1 451 649 B1 are typically aimed at fault causes localized within the control device.

Interference effects resulting from the interaction of a valve control device and a master process controller can often only be considered in an incomplete manner. This makes it difficult to diagnose the causes of problems in situations in which a plurality of control loops of a controller cascade exhibit an undesired behavior. The diagnosis of a fault supposedly located in the valve control device can be an artefact of an operating behavior imposed on the valve control device via the process controller. In such cases, it can be useful for the diagnosis carried out in a valve control device to provide additional process signals, which enable a more reliable identification of the actual fault cause.

U.S. Pat. No. 7,085,610 B2 relates to an industrial process diagnostic device for identifying a source or root cause of an anomaly in an industrial process. A diagnosis of the process control circuits in a process plant is determined based on a plurality of process signals in a process plant (including process variables, control signals and diagnostic signals) by means of a root-cause calculation device. The root-cause calculation device carries out an analysis to determine the root cause of an anomaly, wherein the analysis can be, for example, rule-based or carried out by means of regressive learning, fuzzy logic or a neural network. The root-cause calculation device is designed to be implemented in any process device of a process plant, for example in a transmitter, a controller, a mobile communication device or a computer in a central control room. Practice has shown that process signals necessary to carry out a diagnosis for the determination of a root cause of faults in the interaction of cascaded control loops are at best available to the master process controllers. Process signals from master control loops or other valve control devices are generally not communicated to slave valve control devices. Communication interfaces are often not available for the transmission of various process signals. Even if all necessary interfaces were available, many process signals cannot be provided to individual valve control devices in practice, in particular not in real time, due to the limited bandwidth available in typical communication networks of process plants.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
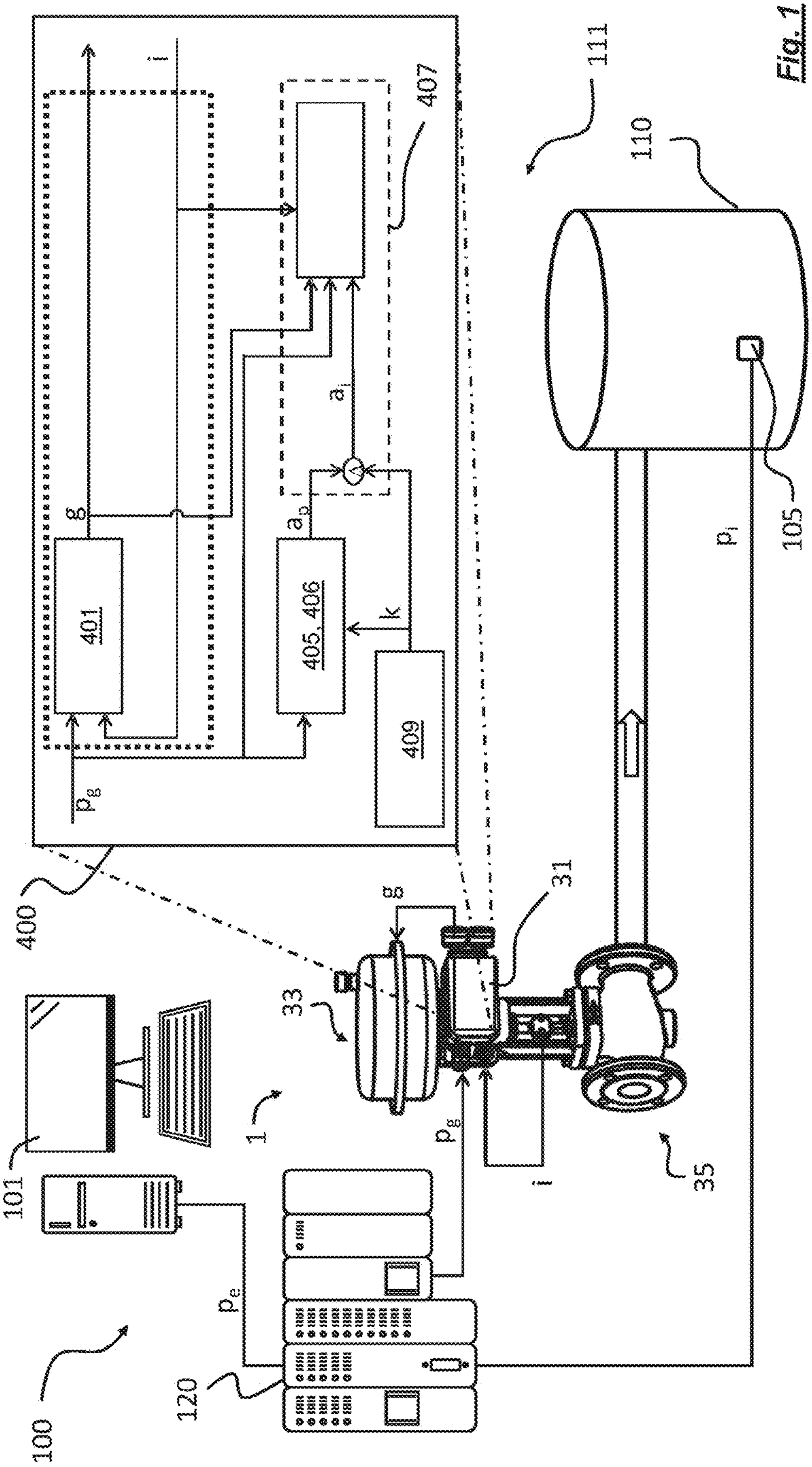
FIG. 1 is a schematic illustration of a process plant with a valve control device according to the disclosure.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

An object of the present disclosure is to overcome the problems of the prior art, in particular to provide a valve control device and/or a diagnostic method which, on the basis of the limited quantity of process signals available locally in the valve control device, renders possible a statement regarding the causes of faults both inside and outside the valve control device. A positioner for a valve control device of a process plant is accordingly provided. The positioner may include a first signal input for a command signal, in particular a process control signal from a process controller of the process plant. The command signal can in particular be discrete or continuously variable temporally. The command signal can be defined as a time series, wherein the time series in particular comprises discrete time-dependent command values. The positioner is configured to generate a control variable for the actuator based on the command signal, in particular the process control signal, and an actual value position signal. The control variable can in particular be discrete or continuously variable temporally. The valve control device in particular comprises a position sensor, such as an adjustment path sensor or a position sensor, which generates, as a function of the measured position of the control valve, in particular of a valve member or a control stem of the control valve, an actual value position signal, which it provides to the positioner.

The positioner can comprise a positioner electronics assembly and potentially a computer-implemented positioner module. The positioner has a first input for an in particular electrical command signal, in particular a process control signal. The positioner can have a second input for an in particular electrical actual value position signal. In particular, the positioner can have a second signal input for an actual value position signal relating to a control valve, such as a second signal input for receiving a sensor value relating to an absolute or relative position of the control valve. The positioner has an output for outputting the in particular electrical or pneumatic control variable for the actuator. The output of the positioner can include a digital-to-analogue converter or an electropneumatic converter. The actuator can be configured to convert a received electrical or pneumatic control variable into a force or torque that is applied to the control valve by the actuator. The positioner can be configured to generate an in particular pneumatic control variable for an actuator for actuating the control valve based on the command signal and the actual value position signal and can comprise an in particular pneumatic control output for the control variable.

According to an exemplary embodiment, the positioner may be configured to calculate an approximation signal based on the command signal by means of a configurable controller model relating to a specific controller, in particular to the process controller, wherein the controller model is configured in such a manner that a signal generated by the specific controller based on the approximation signal corresponds to the command signal. The hypothetical signal and the command signal can in particular correspond approximately. The controller model is in particular deterministic. A deterministic controller model can define a unique, in particular reversible, correlation between the command signal and the approximation signal.

According to an exemplary embodiment, the positioner may be further configured to determine an approximation signal based on the command signal, in particular the process control signal, and a control inversion relating to the process controller. The positioner may also be configured to carry out at least one diagnostic routine while considering the approximation signal. An approximation signal can in particular be discrete or continuously variable temporally. The approximation signal can be defined as a time series. The approximation signal can be qualified as a virtual input variable time series, wherein the input variable time series comprises in particular discrete time-dependent input variable values.

The positioner can comprise a computer-implemented inversion module. The positioner, in particular its inversion module, is configured to calculate approximately a behavior of the master process controller of the valve control device while considering exclusively control device signals available in the control device. The inversion module can be configured to calculate an approximation signal that corresponds to a measured signal of the process controller, which is not transmitted to the valve control device by the process controller. For example, the positioner can determine an approximation signal corresponding to a process controller input signal of the process controller such as an actual value process controller signal.

The positioner electronics assembly and the inversion module can be implemented in functional union by means of an in particular configurable electronic computing/data storage device of the valve control device, for example a microcontroller or the like. The positioner can comprise the diagnostic electronics assembly and/or the control electronics assembly. The valve control device, in particular its inversion module, can in particular be designed to carry out an approximative calculation of a process setpoint signal or a process control difference based on the command signal, in particular the process control signal, received by the valve control device in order to determine the approximation signal.

The positioner, in particular a diagnostic electronics assembly or a diagnostic module of the valve control device, can then carry out a diagnostic routine that considers the previously calculated approximation signal in order to check, for example, whether a fault occurs with a certain probability, preferably with certainty, within the valve control device or has its cause in a master controller cascade of the valve control device, in particular in the process controller. For example, the valve control device can be configured to check whether the approximation signal lies in an inconspicuous or conspicuous value range, wherein the latter points to the master process controller as the fault source. A diagnostic module, a positioner module and/or an inversion module can be implemented by various at least partially different hardware components, for example different microcontrollers of a single valve control device, or alternatively by the same hardware, for example a single microcontroller, of the valve control device.

According to an exemplary embodiment, the positioner may include a memory containing process context data. The positioner can be configured to determine the approximation signal while considering the process context data. Additionally, or alternatively, the positioner can be configured to carry out the at least one diagnostic routine while considering the process context data.

According to an exemplary embodiment of a positioner, process context data can characterize an in particular a constant process setpoint signal. According to a first embodiment, process context data can characterize a signal curve of the process setpoint signal over time and in particular a temporally constant process setpoint signal. According to a variant, process context data can define a constant process setpoint signal in relation to a specific time period. According to a second embodiment, process context data can define a defined set of specific times or time intervals and associated constant process setpoint signals. According to an exemplary embodiment, it is conceivable for the process context data to define characteristic variables of a process setpoint signal. A characteristic variable can in particular be a constant value relating to the signal curve of the process setpoint signal, the first derivative of the signal curve or the second derivative of the signal curve. The approximation of a process signal by a sinusoidal time curve may be appropriate. A process setpoint signal with what is known or assumed to be a sinusoidal curve can comprise process context data in the form of characteristic variables such as amplitude, frequency, offset of the process setpoint signal in the time dimension and/or the amplitude dimension in particular relative to an actual value process signal. For a process setpoint signal with what is known or assumed to be a jumpy curve, characteristic variables such as jump amplitude and/or jump time can be defined as process context data. Process context data can define a controller structure of the process controller mathematically for a controller model, for example a specific PID controller structure, such as a P, I, PI, PD or PID controller structure; or alternatively another controller structure, such as a two-point controller structure.

The positioner, in particular the inversion module, can be configured to determine the approximation signal while considering the process context data. For example, the positioner can be configured to carry out an approximate calculation of a process controller control difference or an actual value process signal based on the command signal, in particular the process control signal, received from the process controller and based on a description of the controller structure of the process controller contained in the process context data. Alternatively, or additionally, the positioner, in particular the diagnostic module, can take process context data into account along with the approximation signal in order to determine whether the approximated behavior of the controller indicates a normal operation or a faulty operation of the controller.

According to a further variant, which can be combined with the previous variant, the positioner is further configured to carry out the at least one diagnostic routine while considering at least one control device signal from the list comprising control variable, actual value position signal and command signal, in particular process control signal. In particular, a control device signal can be selected from the list consisting of control variable, actual value position signal and command signal. For example, the diagnostic routine can comprise a test that uses at least one control device signal available in the positioner in order to carry out a known control device diagnostic. Diagnostic routines are disclosed, for example, in DE 10 2017 124 293 A1, DE 10 2010 015 647 B4, DE 10 2006 003 750 B4, DE 10 2005 024 674 B4, DE 10 2005 024 686 B4 and DE 197 23 650 B9.

According to an exemplary embodiment, the positioner, in particular the inversion module, can be configured to determine an approximation signal corresponding to a process signal, such as a process control difference signal and/or actual value process signal, of the process controller that is not available to the valve control device. The valve control device can be configured to determine an approximation signal that corresponds to a process signal of the process controller that is not transmitted directly by the process controller to the valve control device. This enables the valve control device to replicate approximately a process signal of a master control circuit. The approximately replicated process signal can be used to carry out a diagnosis of potential faults the root cause of which does not lie at the cascade level of the valve control device but at the cascade level of the master process controller of the valve control device.

The disclosure also relates to a valve control device for a process plant, comprising a control valve for adjusting the process fluid flow, an actuator for actuating the control valve and a positioner designed as described in the foregoing for generating a control variable for the actuator. The actuator can be a pneumatic actuator, such as a pneumatic actuating drive, or an electric actuator, such as an electric actuating drive.

The disclosure also relates to a process plant, for example a food processing plant, such as a brewery, a power plant, such as a nuclear power plant, a chemical plant, such as a petrochemical plant, or the like. The process plant comprises a valve control device for adjusting a process fluid flow. The process plant can comprise a plurality of valve control devices for adjusting one or more process fluid flows. One or more valve control devices of the process plant can be designed as described in the foregoing.

The process plant may further include at least one process fluid user that receives the process fluid flow regulated in particular upstream by the valve control device or that delivers the process fluid flow regulated in particular downstream by the valve control device. A process fluid user can be, for example, a reactor, a heat exchanger, a cooling tower or the like. In general, any component of a process plant that generates, uses or consumes process fluid can be called a process fluid user.

The process plant may also include a process sensor that captures an actual value process signal relating to the process fluid user and/or the process fluid. An actual value process signal relating to the process fluid can describe, for example, its temperature, pressure, volume flow, flow velocity or the like. An actual value process signal relating to a process fluid user can describe in particular a measurement value relating to the process fluid user, such as a mixing ratio, a part of one of a plurality of materials to be processed in the process, an ambient temperature, a pressure, a pressure difference or a pressure gradient in the process fluid user, or the like.

The process plant may additionally include a process controller which may be configured to provide a command signal for the valve control device in the form of a process control signal that depends on a process setpoint signal and the actual value process signal. The process controller can be designed to compare the actual value process signal with the process setpoint signal and to provide a process control signal for the valve control device based on the comparison. For example, the process controller can calculate a process control difference between the process setpoint signal and the actual value process signal and determine, by means of a process control routine and based on the process control difference, a process control signal, which it provides to the valve control device. The process controller can optionally be implemented in a PID controller structure. In particular, the process plant is designed in such a manner that the process controller provides the valve control device exclusively with the process control signal, in particular directly. In particular, the process plant is designed in such a manner that the process controller transmits neither the process setpoint signal nor the actual value process signal nor the process control difference, in particular directly, to the valve control device. The disclosure also relates to a diagnostic method for a valve control device that is used in a process plant comprising a valve control device and a process controller. In the course of the use of the valve control device in the plant, a process control signal is provided to the valve control device by the process controller. The process control signal can be determined by the process controller based on one or more process signals. The valve control device can in particular be designed as described in the foregoing. The process plant can in particular be designed as described in the foregoing.

In the diagnostic method, an approximation signal corresponding in particular to a process signal is determined in particular by the valve control device based on the process control signal and a controller model, in particular a control inversion, relating to a specific controller, in particular the process controller. At least one diagnostic routine is carried out by the valve control device while taking this approximation signal into account. This allows a diagnostic method of the valve control device to be carried out that is not exclusively restricted to the control variables directly available in the control device. The diagnostic routine can be carried out in order to establish a diagnostic result and generate a diagnostic code representing the diagnostic result. It has proven advantageous that process signals which occur in a master controller, in particular a master process controller, or a master process control cascade, but which are not fed directly to the valve control device from the latter, can also be considered, at least approximately, by the diagnostic method. This allows a diagnostic routine implemented in a valve control device to identify fault causes outside the sphere or cascade level of the positioner.

The disclosure can also relate to a method for operating a valve control device in a process plant with a process controller, wherein a process control signal is provided to the valve control device by the process controller. If applicable, the process control signal is processed by the valve control device in combination with an actual value position signal in order to determine a control signal. An actuator of the valve control device is controlled with the in particular electric or pneumatic control signal so that the actuator actuates a control valve in order to adjust a process fluid flow. In the operating method, the control signal can be a pneumatic or electric control signal generated by a control electronics assembly of the valve control device and provided to an actuator of the valve control device. A position control difference between the process control signal and the actual value position signal can be considered by the valve control device in the operating method in order to generate the control value. The operating method can comprise that the valve control device carries out at least one diagnostic method as described in the foregoing. The diagnostic method can consider the process control signal, the actual value position signal and/or the control variable.

According to an exemplary embodiment of the diagnostic method, the controller model, in particular the control inversion, i.e. the determination of the approximation signal, and/or the diagnostic routine is carried out based on process context data that characterize the process setpoint signal. The process context data can in particular characterize a constant process setpoint signal. For example, in the diagnostic method, it is possible to first carry out a control inversion relating to a known controller structure of the process controller. Process context values can define one or more boundary conditions of a mathematical equation or system of equations that replicate the process controller. The diagnostic routine can calculate a difference between a process approximation signal that corresponds to an actual value process signal and an approximated, in particular constant, process setpoint signal in the form of the process context data in order to determine a further approximation signal corresponding to a process control difference. The diagnostic routine can compare an approximation signal that corresponds to a process control difference with a permissible value range and, in the event of a deviation from the permissible value range, output a faulty behavior of the process controller as the diagnostic result.

In an exemplary embodiment of the diagnostic method, a time interval can be determined to which the process context data relates. The diagnostic routine can be carried out in relation to a predetermined time interval to which the process context data also relates. For example, process context data can be defined in relation to one or more time-stationary sections in which the process context data characterize a constant process setpoint signal, wherein different, in particular consecutive, time intervals can be assigned to different process setpoint signals.

According to an exemplary embodiment, the process context data can comprise a delay line and/or a signal form definition of the process setpoint signal. In such an embodiment of the diagnostic method, it can be advantageous if a process setpoint signal is provided to the valve control device. The diagnostic method can be carried out based on the process context data and at least one predetermined process setpoint signal while considering a known delay line and/or while considering a known signal form definition. By determining a time interval to which process context data relates, the diagnostic method can base the control inversion and/or the diagnostic routine on a time correlation between process context data and valve control device variables captured in the valve control device such as process control signal, actual value position signal, position control difference. For example, the diagnostic method can comprise a delay line in order to consider a time offset, in particular due to a control cycle time, between the reception of a process setpoint signal by the process controller and the output of a process control signal by the process controller, so that the diagnostic method, in particular the control inversion and/or the diagnostic routine, analyses signals that are closely related causally. The diagnostic method can, for example, consider process context data in the form of a signal form definition of the process setpoint signal which reveals, for example, that the process setpoint signal has a ramp-like curve, a sinusoidal curve or a jumpy curve. If the signal form of the process setpoint signal is at least approximately known, this allows the valve control device to carry out a more precise diagnostic method even when the process setpoint signal cannot be characterized in the form of a constant value.

According to an exemplary embodiment of a diagnostic method, the process control signal is saved. In particular, the time curve of the process control signal is saved. It can be advantageous if the process control signal or its time curve is saved by the diagnostic method, for example, as a series of discrete values, in particular in relation to a time interval, so that the diagnostic method can use the process control signal or its time curve as the basis for the control inversion and/or the diagnostic routine. A saved process control signal or saved time curve of the process control signal, in particular in combination with process context data relating to a time interval, in particular makes it possible to replicate the behavior of a master process controller with precision.

According to an exemplary embodiment, the control inversion of the diagnostic method is determined based on a predetermined continuous-time, in particular real and/or parallel, controller structure. A predetermined continuous-time controller structure can correspond to an analogue process controller control routine. According to an alternative variant, the control inversion of the diagnostic method can be determined based on a predetermined discrete-time, in particular real and/or parallel, controller structure. In particular, the control inversion can be carried out based on a PID controller structure. The predetermined discrete-time controller structure can correspond to a digital control of the process controller.

The control inversion or an inversion module can be configured to calculate the inverse in the z-domain over the variable z by means of an inverted transfer function G of a process PID controller by $$G^{-1}(z) = \frac{1}{K_P}\frac{a2\cdot z^2 - a1\cdot z + a0}{b2\cdot z^2 + b1\cdot z + b0}. \quad (1)$$

For the assumption that is applicable in many cases: $\tau=T_c/2$, the transfer function can be simplified to:

$$G^{-1}(z) = \frac{z^2 - z}{a\cdot z^2 + b\cdot z + c} \quad (2)$$

The parameters a0, a1, a2, as well as b0, b1 and b2 or a, b and c can be transmitted in the same manner as the process context data that characterizes the process controller. In an expedient variant for the calculation of an inverted process control function, the parameters can comprise constant predetermined parameters (a, b and/or c). The control inversion for determining a process approximation signal $a_p$ can be based on the saved parameters. It has been shown that sufficiently accurate results can be provided with a simplified calculation if c=o is assumed, which yields the simplified equation $$G_{ab}^{-1}(z) = \frac{z-1}{a\cdot z + b} \quad (3)$$

The parameters a, b and/or c can be specified for the valve control device by manual user input.

It is conceivable for process context data to be determined at least partially automatically by the valve control device by means of an initialization routine. Process context data can be saved on a memory of the valve control device, in particular of the positioner, based on reference plants or empirical values.

According to an exemplary embodiment, the diagnostic method can comprise the calculation of an approximated actual value process signal. The approximated actual value process signal can be calculated by means of an in particular linear function based on the process control signal. For example, in a particularly simple approach, the actual value process signal can be equated with the control variable.

In an exemplary embodiment of the diagnostic method, a comparison of the diagnostic result with a predetermined setpoint behavior of the control device is carried out. If a deviation between the diagnostic result and a predetermined setpoint behavior is established, a diagnostic code can be generated. If no deviation between the diagnostic result and the predetermined setpoint behavior is established, a diagnostic code can be suppressed and/or deleted. As the diagnostic method first carries out a control inversion relating to the master process controller of the valve control device in order to generate an approximation signal, this process approximation signal, which replicates the behavior of the master process controller of the valve control device, can be used in the further diagnostic method in order to check whether the actual behavior of the valve control device, while taking into account the approximated behavior of the process controller, corresponds to a desired or at least tolerated valve control device setpoint behavior. If the valve control device exhibits a conspicuous behavior yet it can simultaneously be determined based on the approximation signal determined with the diagnostic method that the conspicuous behavior corresponds to a behavior imposed by the process controller, a diagnostic code can be suppressed and/or deleted that would otherwise have been generated and potentially output as a result of the conspicuous behavior of the valve control device. This makes it possible to prevent the output of false positive diagnostic codes. Alternatively, or additionally, a diagnostic code can be generated which indicates a conspicuous behavior of the master process controller of the valve control device if the diagnostic result indicates a discrepancy with a predetermined setpoint behavior. In particular, a diagnostic code can be output if it is established during the comparison that the measured behavior of the valve control device deviates from a predetermined setpoint behavior although there is no indication of conspicuous behavior of the valve control device based on the approximated behavior of the process controller replicated by means of the approximation signal.

The disclosure further relates to the use of a valve control device in particular as described in the foregoing in order to carry out a diagnostic method in particular as described above. The valve control device described above can be configured to carry out the diagnostic method described in the foregoing.

The disclosure teaches and illustrates how a positioner in a control device can gain additional information for the diagnosis of the control device through the approximate reconstruction of the command or control variable of the master controller and how the approximate reconstruction can be understood in each case mathematically as an inversion of the transfer function of a sufficiently accurate model of the master controller.

FIG. 1 shows a schematic illustration of a process plant 100 comprising one or more cascaded control circuits. For the sake of simplicity, merely a single control cascade is illustrated in the schematic illustration according to FIG. 1. The control cascade comprises a master process controller 120 and a slave valve control device 1. Although not illustrated in detail here, it is possible for exactly one field device, two, three or more field devices, in particular control devices, to be slaves to the master process controller 120.

The master process controller 120 can be configured to manage a plant process 111. To this end, the process controller 120 can receive as an input signal an actual value process signal $p_i$ or a plurality of actual value process signals, for example, from a process sensor 105 of a process fluid user 110. A process setpoint signal $p_w$ is specified for the process controller 120 in view of a desired process behavior. The process setpoint signal $p_w$ can be specified for the process controller 120, for example, by means of a user interface, such as a control computer 101 in a control room of a process plant. The process controller 120 is configured to carry out a comparison of the process setpoint signal $p_w$ and the actual value process signal $p_i$ based on which a process control difference pe is determined. Based on the process control difference pe, a process control routine is implemented by the process controller 120. As the result of the process control routine, the process controller 120 outputs a process control signal $p_g$, which is delivered to a slave valve control device 1 so that the valve control device 1 acts on a process fluid in a desired manner, with the aim of causing the actual value process signal $p_i$ to converge with the process setpoint signal $p_w$.

The valve control device 1 comprises a positioner 31, an actuator 33 and a control valve 35. The control valve 35 acts on the process fluid which is provided to the process fluid user 110. Alternatively, it is also possible for control valves to act on the outgoing flow of a process fluid from a process fluid user 110 (not illustrated). The control valve 35 can influence a process fluid pressure, a flow velocity, or the like. It is evident that a process fluid user 110 can comprise a plurality of incoming process fluid flows and/or a plurality of outgoing process fluid flows, wherein valve control devices can be associated with a single or a plurality of the incoming process fluid flows and/or outgoing flows of the process fluid user 110.

The valve control device 1 comprises a positioner 31 with an analogue or digital positioner electronics assembly 400, provided at least in part as a computer-implemented control module 401 as described in detail below with reference to FIG. 2. The positioner electronics assembly 400 has a first signal input 420 for a process control signal $p_g$ and a second signal input 436 for an actual position value i. Depending on the actual position value i and the process control signal $p_g$, a comparison is carried out with a control routine in order to calculate a positioner control difference and determine a control signal g. The positioner electronics assembly 400 outputs the control signal g for actuating the actuator 33 at an output 433.

The positioner electronics assembly 400 further comprises an inversion module 405 to which the process control signal $p_g$ is specified in the form of a signal input and which can receive process context data k describing the behavior of the master process controller 120 from a memory 404. The inversion module 405 is configured to determine, based on the process control signal $p_g$ and by means of a control inversion, an approximation signal $a_p$ that describes the master process controller 120. The approximation signal $a_p$ can correspond, for example, to an actual process controller value or to a process controller control difference pe. An actual value process signal generally depends on the time curve of an actual process controller value, for example a series of discrete actual process controller values or a continuous-time progression of the actual process controller value. Suitable embodiments and functions of the inversion module 405 are described in detail in the following.

The valve control device 1 can further include a diagnostic module 407, for example a diagnostic electronics assembly, which can carry out diagnostic routines relating to the valve control device 1. The diagnostic module 407 can be configured to carry out known diagnostic routines for valve control devices. The diagnostic module 407 can be configured to generate at least one diagnostic code 408 as a function of at least one diagnostic routine. The diagnostic code can be shown on a visual display of the valve control device 1 for a user. The diagnostic code 408 can be transmitted to the process control room, to the process controller 120 or to a portable computer such as a tablet computer for processing. The diagnostic module 407 can be configured to carry out at least one diagnostic routine based on the approximation signal $a_p$. The diagnostic module 407 can consider other signals available in the valve control device 1, in particular in its positioner electronics assembly 31, in the diagnostic routine based on the approximation signal. For example, the diagnostic module 407 can consider the process control signal $p_g$, the control signal g, an actual value position signal i, a positioner control difference or the like when carrying out the diagnostic routine based on the approximation signal $a_p$. Possible variants of the positioner 400 with configurable electronic computing/data storage device with a computer-implemented diagnostic module 407 are described in the following.

Figure 2:
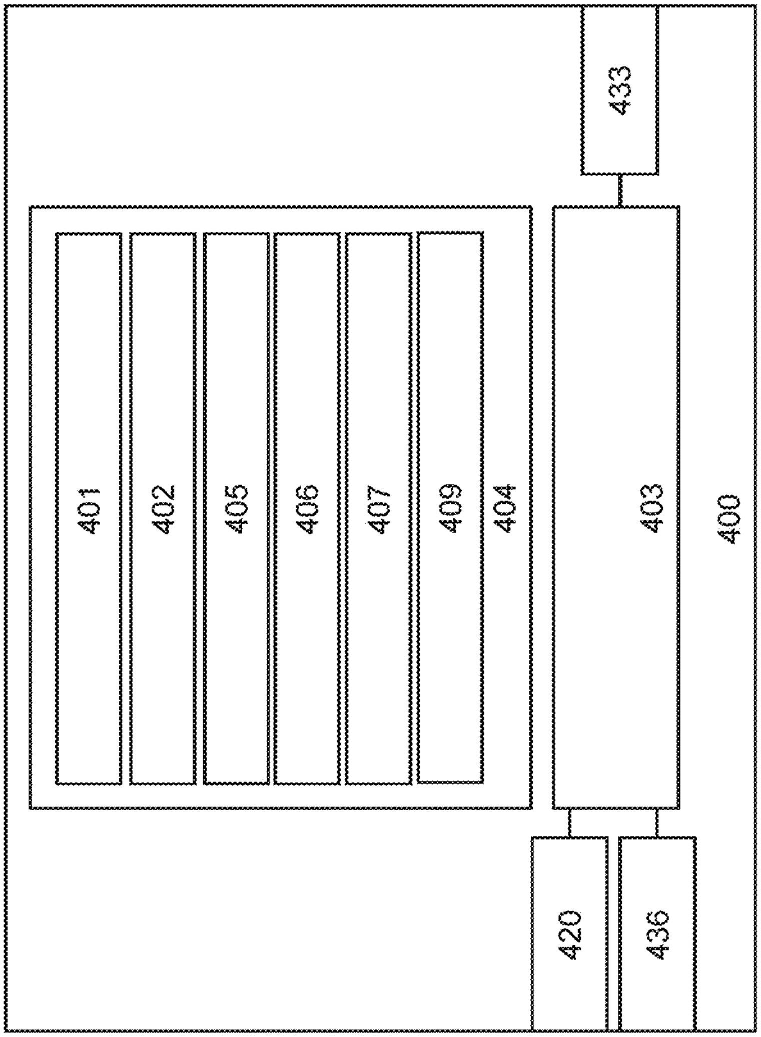
FIG. 2 is a schematic block diagram of a digital positioner according to the disclosure.

FIG. 2 shows a block diagram of a digital positioner 31 formed with a configurable electronic computing/data storage device 400. The schematic block diagram illustrates a digitized positioner electronics assembly 400 with a configurable electronic computing/data storage device. However, the functions disclosed in this connection could be provided in part or entirely by means of analogue positioner electronics components.

The digital positioner electronics assembly 400 comprises a processor 403, for example in the form of a microprocessor, which is configured to carry out various calculations. The processor 403 of the digital positioner electronics assembly 400 is linked to a memory 404. Different data and/or routines can be saved on the memory 404 for use by the processor 403. A first calculation module 401 can be saved on the memory 404 for a control routine of the valve control device 1. The first calculation module 401 can be described as a control module. A digital position control can be implemented with the control module. The control module 401 can be implemented with the processor 403 in order to provide a control signal g at the output 433 of the digital positioner electronics assembly 400 for actuating the actuator 35. The processor 403 can be configured by means of the control module 401 to calculate a control routine based on an actual value position signal i provided by a position sensor 36 and a process control signal $p_g$ provided by the master process controller 120. The control routine of the first calculation module 401 can be, for example, a digital PID control routine.

The positioner electronics assembly 400 can have two or more signal inputs 420, 436 for signals that are to be processed in the processor 403 according to a routine. The digital positioner electronics assembly 400 comprises a first signal input 420 for receiving a process control signal $p_g$. In embodiments, this first signal input 420 can comprise an analogue-to-digital converter in order to generate a digital signal for use in the digital positioner electronics assembly 400 based on, for example, simple analogue signals, such as an analogue 4-20 mA process control signal. The digital positioner electronics assembly 400 further comprises a second signal input 436 for receiving an actual value position signal i. The digital positioner electronics assembly 400 further comprises a control signal output 433. The processor 403 can be configured to execute the control module 401 with the control routine in order to carry out a position control based on the signals i, $p_g$ received at the inputs 420, 436 and to provide as its result a control signal g at the control signal output 433 for actuating an actuator 33. In embodiments, the control signal output 433 can comprise a digital-to-analogue converter or an electropneumatic converter in order to provide a control signal g adapted to the actuator 33. The digital positioner electronics assembly 400 can include further signal inputs or outputs (not illustrated in detail). The positioner can further include an interface for the manual input of data.

The actuator 33 can be equipped with a signal amplifier in order to amplify a control signal g using auxiliary electrical and/or pneumatic power from an auxiliary power source.

The memory 404 of the digital positioner electronics assembly 400 can contain one or more diagnostic routines in order to provide a diagnostic module 407. The diagnostic routines are configured to be carried out by the processor 403. The processor 403 can carry out a diagnostic routine, for example, relating to the control signal g and the actual value position signal. For example, a diagnostic routine can initiate the execution of a partial stroke test and evaluate its result.

The memory 404 can contain input data 402, wherein the input data 402 saved in the memory 404 are expediently associated with a specific time or time interval. In one embodiment, input data 402 consist exclusively of control device signals. The processor 403 can be configured to carry out a diagnostic routine using the input data 402 relating to a predetermined time interval, for example in order to compare current input data 402 of a current time interval with historical input data 402 of another time interval or determined reference interval. A deviation from historical diagnostic results of a reference interval can indicate, for example, wear on the control valve 35. The diagnostic routine can be designed to establish whether there is a conspicuous signal curve such as a trend in one direction.

As set out above, the valve control device 1 can comprise a positioner 31 which is configured to carry out a diagnostic routine, the positioner 31 being equipped with a digital positioner electronics assembly 400 comprising a memory 404 with a diagnostic routine 407 saved on it and a processor 403 for carrying out the diagnostic routine 407. The positioner 31 can generate a control variable g for an actuator 33 by means of the digital positioner electronics assembly 400.

In the present disclosure, the positioner is further configured to carry out a control inversion relating to a master process controller 120. With the control inversion, an approximation signal $a_p$ can be determined based on the process control signal $p_g$. The approximation signal $a_p$ can serve as the basis for a diagnostic routine 407. To this end, the memory 404 of the configurable electronic computing/data storage device 400 can be equipped with a second calculation module 405, which can be called a modelling module or inversion module.

The second calculation module comprises configuration data 406 for defining a controller model for a particular controller. The configuration data 406 for adapting the model are used to adapt the controller model to a specific controller, for example to the master process controller of the valve control device. It is optionally possible to additionally save process context data 409 that characterize the behavior of the master process controller 120 of the valve control device 1 on the memory 404. The processor 403 can be configured to execute the second calculation module 405 and/or at least one diagnostic routine 407 while considering process context data 409. A schematic illustration of the position control occurring in the positioner 31 as well as of the control inversion and, if applicable, diagnostics occurring in parallel is illustrated in a first embodiment in FIG. 3 and in a second embodiment in FIG. 4.

With reference to FIG. 1, it is evident that, in the process control carried out with the process controller 120, an actual value process signal $p_i$ and a process setpoint signal $p_w$ are necessary as known process variables based on which a process control signal $p_g$ is determined as the unknown process variable to be calculated by means of the predetermined process control routine. This process control routine can be represented by a model controller. The process control signal $p_g$ is transmitted to the slave positioner 1. The process setpoint signal $p_w$, actual value process signal $p_i$ and other process signals are generally not known to the valve positioner 1.

Figure 3:
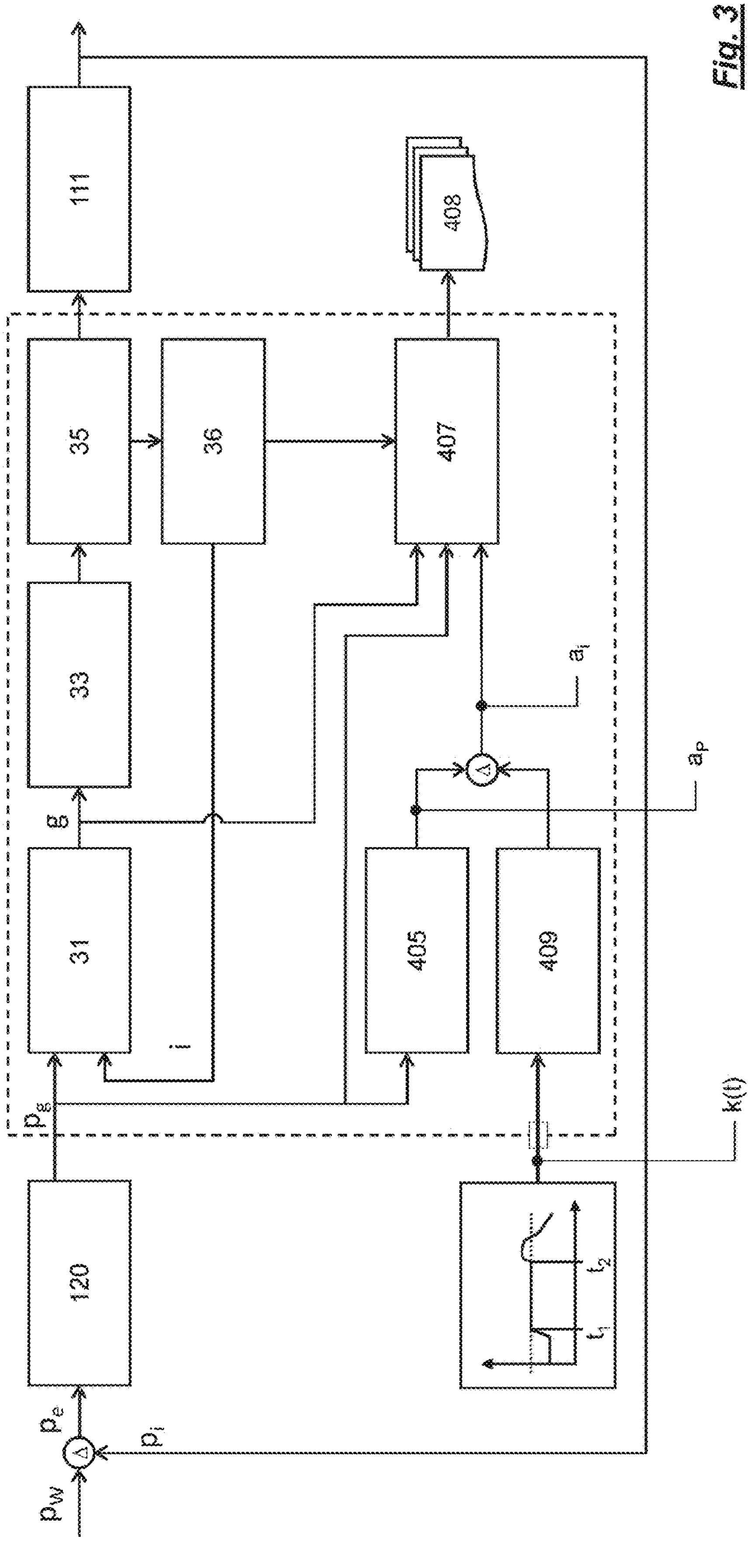
FIG. 3 is a schematic illustration of a first method for operating the process plant with the valve control device according to the disclosure.

FIG. 3 shows an embodiment of an operating method in which a control and, in parallel, a diagnostic method including a control inversion and, where appropriate, a diagnostic routine are carried out. The second calculation module 405 can comprise configuration data 406 for adjusting the model. The second calculation module or inversion module 405 can in particular be configured to replicate the inverse of a model controller with which the process control routine of the master process controller 120 of the valve control device 1 is approximated. The second calculation module 405 is configured to invert a transfer function relating to the master process controller 120 in a spectral domain such as a Laplace or z-space. The implementation of the control inversion carried out with the second calculation module 405 in the processor 403 of the digital positioner electronics assembly 400 serves to reconstruct approximately the input data ($p_i$, $p_w$) of the process controller 120 based on the process control variable $p_g$ output by the process controller 120 and received by the control device 1. The second calculation module 405 is designed to carry out a calculation by means of the processor 403 based on the process control signal $p_g$ as the known variable with the help of process context data k in order to calculate an approximation signal $a_p$, which is considered the unknown variable. The approximation signal $a_p$ corresponds to a process signal, in particular to the process control difference pe or to the actual value process signal $p_i$.

The process context data k or 409 can be relate to the process setpoint signal. Using the process context data k, it is possible to assume an at least occasionally constant process setpoint signal $p_w$ during the control modelling, in particular inversion, with the second calculation module 405. By means of the process context data k, the control inversion can be based on a plurality of different, in particular constant, process setpoint signals $p_w$ associated with different time intervals. Alternatively, or additionally, the second calculation module 405 can use process context data k that replicate a time curve of a non-constant process setpoint signal $p_w$. According to a further alternative option, the process context data k can provide the second calculation module 405 with information regarding signal curve characteristics of the process setpoint signal $p_w$. For example, process context data k can provide the second calculation module 405 with information regarding a, for example linear, ramp-like curve of the process setpoint signal $p_w$. The process context data k can provide the second calculation module with information regarding a sinusoidal curve of the process setpoint signal, for example its frequency, amplitude, offset in the amplitude direction or offset in the time dimension. Alternatively, or additionally, the second calculation module can consider process context data describing a jumpy behavior of the process setpoint signal, for example its amplitude, frequency, jump time or the like.

The operating method illustrated in FIG. 3 relates to a positioner 31 which processes exclusively the process control signal $p_g$ of the master process controller 120. The positioner 31 according to the embodiment illustrated in FIG. 3 does not process any signals received directly from the master controller cascade other than the process control signal $p_g$. In particular, the positioner 31 does not receive any signals from the master process control cascade other than the process control signal $p_g$. In the method illustrated in FIG. 3, the positioner is provided with predetermined process context data k(t) relating in particular to time intervals $t_2$-$t_1$. For example, process context data k can be entered in the form of empirical values manually via a user interface. Alternatively, or additionally, process context data k can be saved in a factory setting on the memory 404 of the positioner electronics assembly 400 before the valve control device 1 is put into operation for the first time.

Figure 4:
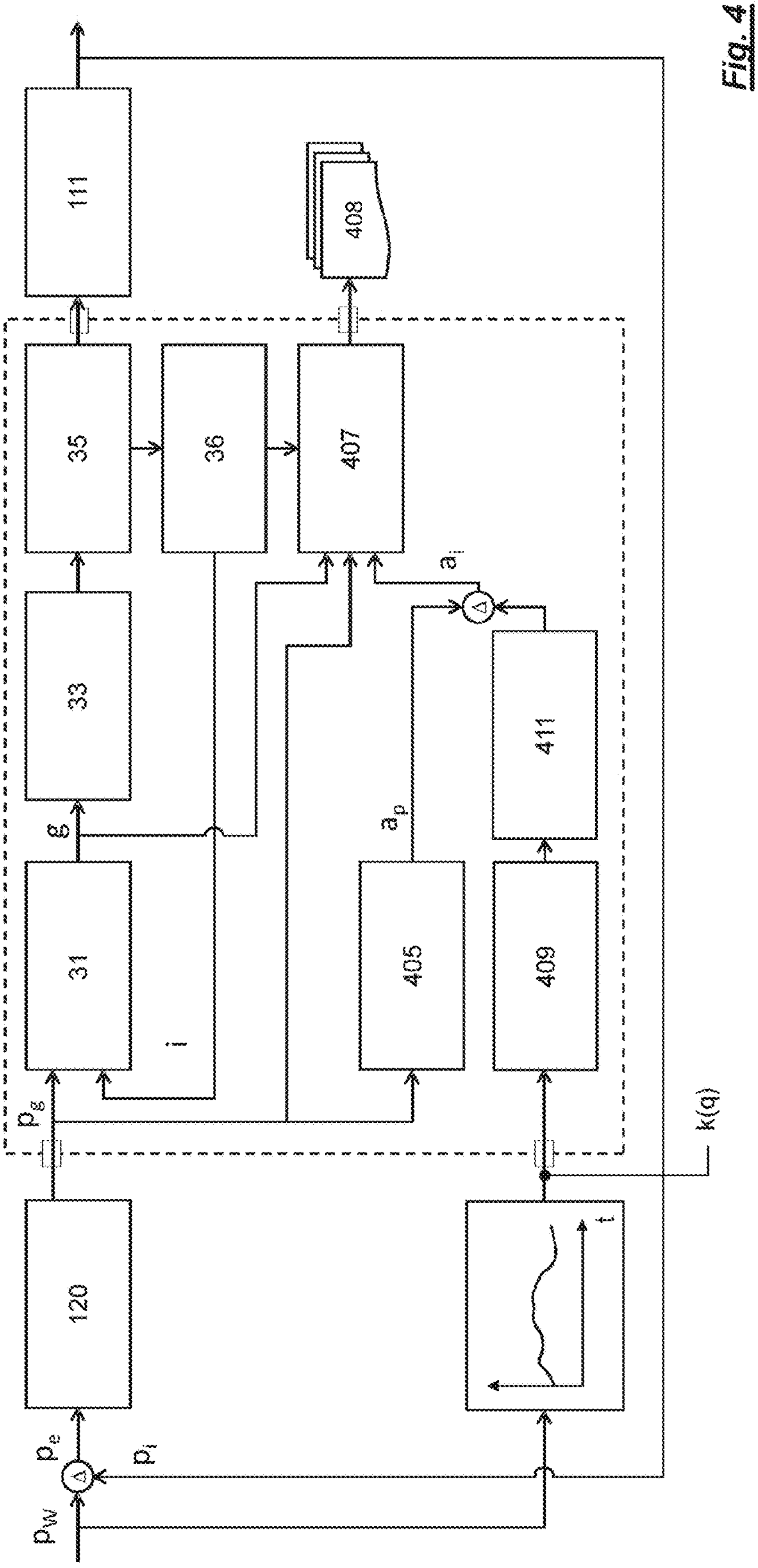
FIG. 4 is a schematic illustration of a second method for operating the process plant with the valve control device according to the disclosure.

FIG. 4 shows an alternative embodiment of an operating method in which a control and, in parallel, a diagnostic method including a control inversion and, where appropriate, a diagnostic routine are carried out. The operating method illustrated schematically in FIG. 4 differs from the method according to FIG. 3 essentially only in the provision/receipt of process context data k. In the embodiment according to FIG. 4, the valve control device 3 includes a further input for receiving at least one process setpoint signal $p_w$ of the process plant 100. The process setpoint signal $p_w$ can be received, for example, as a series of digital process setpoint signals. For example, an analogue or digital signal input of the valve control device 1 can receive the process setpoint signal $p_w$ as a further input value, which is simultaneously fed in the process plant 100 to the process controller 120 for the process control. Alternatively, it is conceivable for the process controller 120 to be configured and connected to the valve control device 1 according to the signal transmission in order to additionally transmit the process setpoint signal $p_w$ to the further input of the valve control device 1. The process setpoint signal $p_g$ can be received by the valve control device 1, for example, in digital form in the form of a plurality of process setpoint signals $p_w$ to be processed in sequence. The time series q of process setpoint signals can be saved in a retrievable manner by the digital positioner electronics assembly 31 in the memory 404 as process context data k(q). According to an advantageous embodiment, a specific time or time interval t is respectively associated with the received process setpoint data of the time series q of process context data. Process setpoint signals $p_w$ received as a time series q can be saved correlated to a delay line or to a temporal offset in the form of process context data 409. A temporal offset or delay line 411 allows a correlation of temporally upstream process setpoint signals $p_w$ and temporally downstream process control signals $p_g$ that are to be linked in the in particular inverted control routine, which can be adapted with configuration data 406, according to the second calculation module 405. For example, the control inversion can be based on a process control signal $p_g$ in combination with the process setpoint signal $p_w$ shifted by a cycle time of the digital positioner electronics assembly 400.

In a digital process control or digital control device control, there is usually a time delay of in particular exactly one (process) controller cycle time between the reception of a (process) setpoint value and the output of the (process) control signal assigned by means of the (process) control routine to this (process) setpoint value. In order for the control inversion to be able to determine a more precise approximation of an actual process value or a process command value based on the process control value, it can be helpful to include a process control value and in particular a process setpoint value that is older by exactly one process controller cycle time for the control inversion. Alternatively, it is possible to carry out a sufficiently accurate approximation by control inversion without a delay line, in particular in cases of slow processes with a gradually, in particular continuously, variable process setpoint signal.

Figure 5:
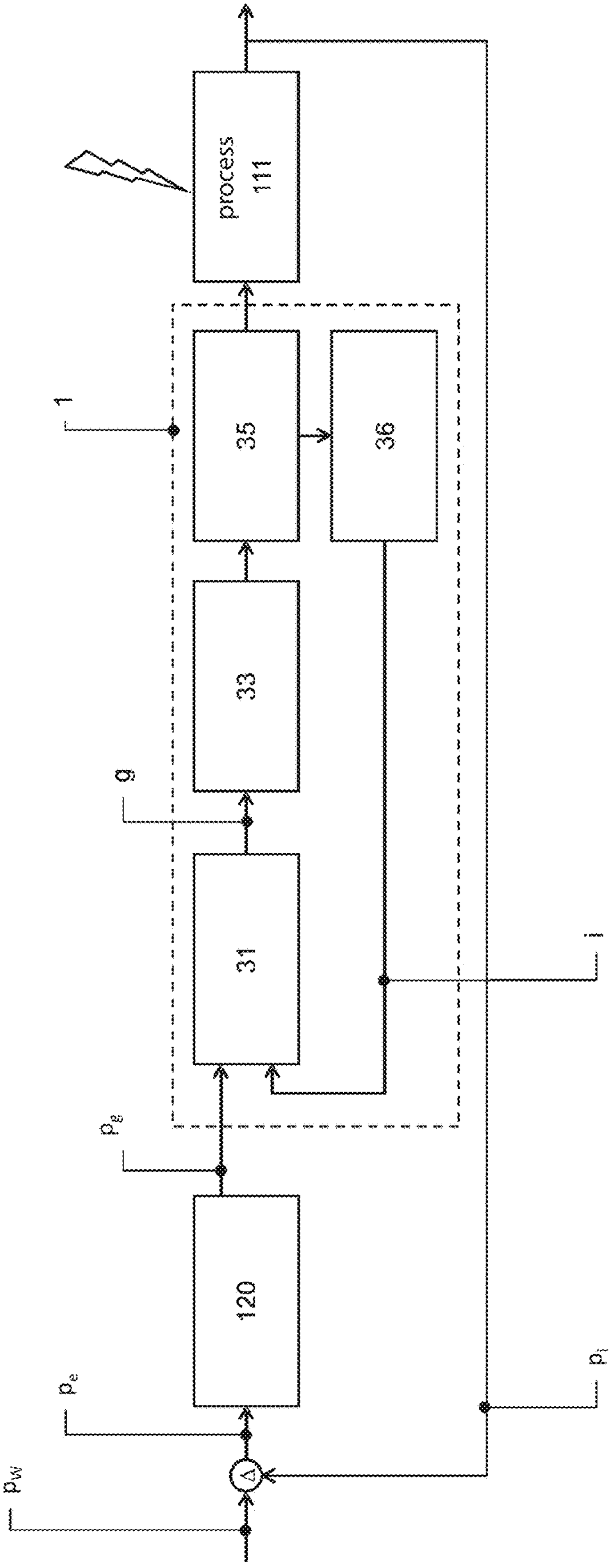
Fig. 5 (Related Art)
FIG. 5 is a schematic illustration of an example process plant cascaded process control.

The second calculation module 405 may be configured to replicate the inverse of a process controller 120 in the form of a model controller configured according to a PID controller structure. For example, the second calculation module 405 can implement a control inversion in particular with respect to a process controller 120 modelled as a PID controller. In particular, the inversion module 405 can carry out the control inversion in relation to a process controller 120 modelled as a P controller, I controller, PD controller, PI controller or PID controller. A process controller 120 modelled in a PID controller structure can be described by a mathematical function GPD which determines, based on the known variables process setpoint signal $p_w$, actual value process signal $p_i$ and/or process control deviation pe, a process control signal $p_g$ as the unknown variable and output value. In the modelling module or inversion module 405, it is possible for the known mathematical control function to serve as the basis for an inverted calculation in such a manner that the process control signal $p_g$ is taken into account as a known variable together with a process setpoint signal $p_w$, which is deemed to be an at least approximately known variable, in order to determine an approximation signal $a_p$ that corresponds in particular to an actual process value $p_i$ or to a process control deviation pe. The process control routine of a process controller 120, for example in a PID controller structure outlined in FIG. 5, can be represented mathematically in Laplace space L by means of the equations:

$$X(s) = W(s) - G_{PID}^{-1}(s) \cdot Y_V(s) \tag{4}$$

$$x(t) = L^{-1}\{X(s)\} \tag{5}$$

where

- W(s) is the Laplace transform of the real-value function $p_w$ (t): describing the time curve of the process setpoint value $p_w$: $\mathbb{R} \rightarrow \mathbb{R}$;
- X is an actual process value of the discrete or continuous-time actual value process signal $p_i$;
- $Y_V$ is a process control value of the discrete or continuous-time process control signal $p_g$; and
- $G_{PID}$ describes the transfer function of the PID process controller and
- s represents a dependence on the Laplace variable.

The following holds true for the transfer function of a continuous-time PID controller in a parallel structure with a real D-part time constant t in the Laplace domain with the proportional gain $K_P$, the reset time $T_N$ and the lead time $T_V$:

$$G_{PID}(s) = K_P \cdot \left(1 + \frac{1}{T_N} \cdot \frac{1}{s} + T_V \cdot \frac{s}{\tau \times z + 1}\right) \tag{6}$$

It can be advantageous for a valve positioner if the equation (5) is rephrased as a differential equation, inserted into the following equation (6) and considered with regard to a discrete scanning step k:

$$x(k) = w(k) - e(k) = w(k) - Z^{-1}\left\{\frac{Y_V(z)}{G_{PID(z)}^{-1}}\right\} \tag{7}$$

For a discrete-time controller, the transfer function can be determined using the Tustin transformation according to equation (7), wherein $T_c$ is chosen according to a cycle time of the process controller:

$$s = \frac{2}{T_C} \cdot \frac{z-1}{z+1} \tag{8}$$

This yields $$G_{PID}^{-1} = \frac{1}{K_P} \cdot \frac{a_2 z^2 + a_1 z + a_0}{b_2 z^2 + b_1 z + b_0} \tag{9}$$

where where $$a_2 = 2T_N(T_C + 2\tau) \tag{10}$$

$$a_1 = -8\tau T_N \tag{11}$$

$$a_0 = -2T_N(T_C - 2\tau) \tag{12}$$

$$b_2 = 2T_N(T_C + 2\tau) + T_C(T_C + 2\tau) + 4T_N T_V \tag{13}$$

$$b_1 = -8\tau T_N + 2T_C^2 - 8T_N T_V \tag{14}$$

$$b_0 = -2T_N(T_C - 2\tau) + T_C(T_C - 2\tau) + 4T_N T_V \tag{15}$$

Using the positioner electronics assembly 400, an approximation signal $a_p$ can be calculated approximately with the modelling or inversion module 405 based on the process control signal $p_g$, which correlates to the process control difference $p_e$ or to the actual value process signal $p_i$.

Alternatively, for some controller structures, a different calculation can be performed directly in the time interval without using a Laplace space. For example, an approximation signal corresponding to a signal response of a PI controller can be determined. The inversion of a time (t)-dependent transfer function $G_{PI}(t)$ of a PI process controller is known. The controller model can be configured with a proportional backcalculation factor with respect to the P factor of the transfer function $G_{PI}(t)$ and with a differentiation along with a proportional differentiation factor with respect to the I factor (not illustrated in detail). With such an inverted transfer function of a continuous-time PI controller $G_{PI}(t)$, an approximation signal $a_p$ can be determined based on a command signal provided by the process controller.

The diagnostic routine 409 can be configured to analyze one or more approximation signals $a_p$ replicating process control differences, for example a set of approximated control differences $p_e$ established in a chronological sequence q. Using this set, the diagnostic routine 407 can determine a diagnostic code 408 relating to the steady-state accuracy, overshoot, stability, etc. of the master process control. For example, the stability of the overall control circuit including process and position control can be evaluated.

For example, the number of overshoots can be considered for diagnostic purposes. Based on the number and amplitude of overshoots of the diagnostic routine 407, a diagnostic code 408 can be determined regarding the quality of process control and position control. For example, it can be determined with a diagnostic routine 407 as a diagnostic result that there is an efficient process control and position control if there are few overshoots. If the number of overshoots exceeds a threshold value, it can be determined with the diagnostic routine 407 that an improvement of process control and position control through an adjustment of the control parameters of the positioner 1 and/or process controller 120 is recommended.

The features disclosed in the foregoing description, figures and claims can be significant both on their own as well as in any combination for the provision of the disclosure in the different variants.

LIST OF REFERENCE SIGNS

1 Control device
31 Positioner
33 Actuator
35 Control valve
100 Process plant
105 Process sensor
110 Process fluid user
111 Plant process
120 Process controller
400 Positioner electronics assembly
401 Control module
402 Input data
403 Processor
404 Memory
405 Calculation module
406 Configuration data
407 Diagnostic module
408 Diagnostic code

409 Process context data
411 Delay line
420 First signal input
433 Output
436 Second signal input
$a_p$ Approximation signal
g Control signal
i Actual position value
k Process context data
$p_d$ Process control difference
$p_e$ Process control difference
$p_g$ Process setpoint signal
$p_i$ Actual value process signal
$p_w$ Process setpoint signal
q Time series

The invention claimed is:

1. A positioner for a valve control device of a process plant, comprising:

a first signal input for a command signal including a process control signal from a process controller of the process plant, and a second signal input for an actual value position signal relating to a control valve, the positioner being configured to generate a control variable, for an actuator to actuate the control valve, based on the command signal and the actual value position signal, wherein the positioner is further configured to calculate, using a configurable controller model relating to the process controller, and based on the command signal and a control inversion relating to the process controller, an approximation signal, the controller model being configured such that a signal generated based on the approximation signal by the process controller corresponds to the command signal.

2. The positioner according to claim 1, configured to carry out at least one diagnostic routine based on the approximation signal.

3. The positioner according to claim 1, further comprising a memory storing process context data, the positioner being configured to:

determine the approximation signal based on the process context data, and/or carry out the at least one diagnostic routine based on the process context data.

4. The positioner according to claim 1, wherein the positioner is further configured to carry out at least one diagnostic routine based on: the control variable, the actual value position signal, and/or the process control signal.

5. The positioner according to claim 1, wherein the positioner is configured to calculate the approximation signal corresponding to a process control difference signal and/or actual value process signal of the process controller that is not available to the valve control device.

6. A valve control device for a process plant, comprising:

a control valve configured to adjust a process fluid flow, a pneumatic or electric actuator configured to actuate the control valve, and a positioner according to claim 1.

7. The positioner according to claim 1, further comprising a control output for the control variable.

8. The positioner according to claim 7, wherein the control output is a pneumatic control output and the control variable is a pneumatic control variable.

9. The positioner according to claim 1, wherein the control inversion comprises inverting a transfer function relating to the process controller in a spectral domain.

10. The positioner according to claim 1, wherein the control inversion is configured to reconstruct input data of the process controller based on the command signal received by the valve control device.

11. The positioner according to claim 1, further comprising an inversion module configured to calculate the approximation signal, wherein the approximation signal corresponds to a process control difference signal or an actual value process signal of the process controller.

12. A diagnostic method for a valve control device in a process plant with a process controller that controls the valve control device, the method comprising:

providing, by the process controller, a process control signal to the valve control device;

configuring a controller model relating to the process controller;

determining, by the valve control device and using the controller model, an approximation signal based on the process control signal and a control inversion relating to the process controller; and performing at least one diagnostic routine by the valve control device based on the approximation signal.

13. The diagnostic method according to claim 12, wherein the determination of the approximation signal and/or the diagnostic routine is further carried out based on process context data characterizing a process setpoint signal.

14. The diagnostic method according to claim 13, wherein:

the method further comprises determining a time interval to which the process context data relate, and/or the process context data includes a delay line and/or a signal form definition of the process setpoint signal.

15. The method according to claim 13, further comprising determining a comparison of the diagnosis result with a predetermined setpoint behavior of the valve control device.

16. The diagnostic method according to claim 15, wherein:

in response to a deviation between the diagnostic result and the predetermined setpoint behavior, generating a diagnostic code; and in response to a lack of a deviation between the diagnostic result and the predetermined setpoint behavior, suppressing and/or deleting a diagnostic code.

17. The diagnostic method according to claim 12, further comprising saving a time curve of the process control signal.

18. The diagnostic method according to claim 12, wherein configuring the controller model includes determining the control inversion based on a predetermined continuous-time or time-discrete controller structure.

19. The diagnostic method according to claim 18, wherein the control inversion is formed by an inverse in the z-domain over variable z by:

$$G_{approx}^{-1}(z) := \frac{z^2 - z}{a \times z^2 + b \times z + c}$$

wherein a, b, and c are predetermined parameters.

* * * * *